United States Patent
Conti et al.

(10) Patent No.: US 9,901,831 B2
(45) Date of Patent: *Feb. 27, 2018

(54) SYSTEM AND METHOD FOR ONLINE COMMUNITY MANAGEMENT

(71) Applicant: Take-Two Interactive Software, Inc., New York, NY (US)

(72) Inventors: Dan Conti, Reading, MA (US); Evan Michaels, Bromley (GB); Pablo Aguilar Fruto, Barcelona (ES)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,792

(22) Filed: Apr. 24, 2017

(65) Prior Publication Data

US 2017/0225079 A1    Aug. 10, 2017

Related U.S. Application Data

(63) Continuation of application No. 13/894,112, filed on May 14, 2013.

(51) Int. Cl.
| | |
|---|---|
| *A63F 13/00* | (2014.01) |
| *A63F 13/75* | (2014.01) |
| *A63F 13/35* | (2014.01) |
| *A63F 13/79* | (2014.01) |
| *A63F 13/87* | (2014.01) |
| *A63F 13/70* | (2014.01) |
| *A63F 13/798* | (2014.01) |
| *A63F 13/795* | (2014.01) |

(52) U.S. Cl.
CPC .............. *A63F 13/75* (2014.09); *A63F 13/35* (2014.09); *A63F 13/70* (2014.09); *A63F 13/79* (2014.09); *A63F 13/87* (2014.09); *A63F 13/795* (2014.09); *A63F 13/798* (2014.09)

(58) Field of Classification Search
CPC .......... A63F 13/12; A63F 13/70; A63F 13/75; A63F 13/795; A63F 13/798
USPC ........................................................ 463/42
See application file for complete search history.

(56) References Cited

U.S. PATENT DOCUMENTS

| | | |
|---|---|---|
| 7,169,050 B1 | 1/2007 | Tyler |
| 7,517,282 B1 | 4/2009 | Pryor |
| 7,753,795 B2 | 7/2010 | Harris et al. |
| 8,360,890 B2 | 1/2013 | Tyler |

(Continued)

*Primary Examiner* — Jay Liddle
*Assistant Examiner* — Ryan Hsu
(74) *Attorney, Agent, or Firm* — Orrick, Herrington & Sutcliffe LLP

(57) ABSTRACT

Disclosed are systems and methods for online community management. The disclosed system allows for automatic identification and punishment of players exhibiting bad sportsmanship through a combination of automatic detection schemes and a peer reporting scheme. In addition to the sportsmanship check, the disclosed system also provides automatic checks for identifying potential cheaters and generating a potential cheaters list for review by admin staff. As a result of either classification system, players found to be either bad sports or cheaters are not allowed to participate in play with the general pool of players, but instead must play in an alternate pool. For extremely harmful conduct, players may be banned from the online community.

20 Claims, 2 Drawing Sheets

(56) References Cited

U.S. PATENT DOCUMENTS

| | | |
|---|---|---|
| 2003/0216962 A1* | 11/2003 | Heller .................... A63F 13/12 |
| | | 705/318 |
| 2006/0247055 A1 | 11/2006 | O'Kelley, II et al. |
| 2008/0182660 A1 | 7/2008 | Fulton et al. |
| 2008/0305869 A1 | 12/2008 | Konforty et al. |
| 2009/0144416 A1 | 7/2009 | Goglin et al. |
| 2010/0162405 A1 | 6/2010 | Cook et al. |
| 2012/0142429 A1 | 6/2012 | Muller |

* cited by examiner

SYSTEM AND METHOD FOR ONLINE COMMUNITY MANAGEMENT

CROSS REFERENCE TO RELATED APPLICATIONS

This application is a continuation of and claims priority to application Ser. No. 13/894,112 filed May 14, 2013, and which application is hereby incorporated by reference in its entirety and for all purposes. This application is also related to commonly assigned, co-pending application Ser. No. 13/894,099, entitled "System and Method for Network Gaming Architecture," Ser. No. 13/894,109, entitled, "System and Method for Multiplayer Network Gaming," and Ser. No. 13/894,104, entitled, "System and Method for Time Flow Adjustment in Multiplayer Games," which are incorporated herein by reference.

FIELD

The present application relates to management of a community of players in an online gaming environment. More specifically, the present disclosure describes computerized systems, methods, and apparatuses for improved player management through an automated player classification and punishment system. While the invention is disclosed with respect to an online multiplayer game experience, it could also be applied to other communities such as file/content sharing, online social networking environment, or any system requiring the management of large user populations over the internet.

BACKGROUND

Many videogames offer an online multiplayer mode in addition to a storyline mode. The commercial success of many videogames can be attributable, to some degree, on the multiplayer offering of the videogame. Online multiplayer games have become so popular that some games have communities as large as several million players. With any large community, especially anonymous online communities, there exists a greater propensity for some players to engage in anti-social behavior, unsportsmanlike conduct, or cheating. These sorts of players can detract from the experience of normal players and in the aggregate can greatly diminish enjoyment of a game. In order to address these negative players and provide an enjoyable multiplayer experience for all players, developers often maintain an administrative staff to manage the online community through the investigation of complaints, appeals, and tracking of cheaters or other suspect players. Community management is an extremely complicated and labor intensive task. Providing this type of manual community management presents an extremely large overhead cost to developers that must be maintained well after the initial purchase of the game.

In addition to cost, manual community management can be ineffective with the large volume of games occurring around the clock, addressing complaints and appeals can be not only extremely costly, but also time intensive such that delays can also detract from the multiplayer experience with players having to wait while staff investigate appeals of false accusations. However, cost and speed are not the only factors to be considered, fairness is also a driving force in any community management system and thus the determinations and punishments should be clear to all users and fairly enforced. Finally, as in any complex system such as a multiplayer game, there is great vulnerability for exploitation and abuses may not all be identified at the onset; the system should therefore be flexible in its ability to identify and deal with new types of cheating. Thus, an effective community management system must balance all four considerations of cost, time efficiency, fairness, and flexibility.

BRIEF SUMMARY

Innovative systems and methods for online community management are disclosed for providing a community management system that is cost effective, quick, fair, and flexible. The disclosed systems and methods are applicable for use with any online community, and while it is disclosed with respect to an online multiplayer game experience, they could be applied to other communities such as file/content sharing, online social networking environment, or any system requiring the management of large user populations over the internet.

The disclosed systems and methods improve on existing community management systems by providing an automated system in conjunction with a manual system that has a tiered classification system and a scaled punishment system.

In order to significantly lower the cost and increase the speed of community management, an automated component of the system is implemented. For certain types of actions where undesired conduct is clearly and easily detected the automated component of the system can be used to effectively reduce costs by handing all community management activities for these types of activities. The automated component of the system can also aid admin staff by identifying players that engage in questionable conduct for further investigation. Some examples of activities that could easily and automatically be detected by the system include: players leaving while a game is in progress, data and stat manipulation, and the modification of game files.

Additionally, the system offers a peer reporting system that allows users to report other players for undesired conduct thus shifting some of the burdens of policing the less egregious conduct onto the community. To prevent peer report abuse, user's reports are "weighted" with their frequency. A user who submits multiple reports over a short period of time has the effect of each of their reports proportionately reduced. Users may also report positive conduct. Although one negative report may not adversely change the status of a player, in the aggregate they can cause a player to be adversely effected by altering the player's ability to participate in the game.

An optional manual component working closely with the automated component can maintain flexibility and fairness in the system. Undesired conduct can come in many forms and that are not always easily detected or classified by automated processes. Thus, it may be advisable to maintain a manual component of the community management system comprising admin staff to address and make determinations on conduct that is not easily and automatically detectable. The automated component can provide additional tools and notifications to reduce the burden on the admin staff.

Generally the behaviors of interest are referred to as undesired behavior, but more specifically, these behaviors include but are not limited to: bad sportsmanship, bullying, offensive conduct, poor connection, stats manipulation, bug exploitation, repeat offenders, hacking, and piracy. To properly identify and address each type of conduct, the system utilizes a classification system including five classifications: non-cheaters, bad sports, cheaters, repeated cheaters, and banned players. In addition to the classification system, an appropriately scaled punitive system can be automatically implemented to issue appropriate punishment.

Bad sportsmanship or anti-social conduct can be quantified though automatic tracking of certain pre-determined behaviors by the system or though peer reports. This type of conduct makes up the large majority of the negative conduct within many communities and thus automation can greatly reduce the cost and overhead to developers. Additionally a well crafted peer review system can shift the burden from admin staff to the community. Generally, bad sportsmanship does not warrant a complete ban and is, in the single instance, not as big a concern as cheating or hacking to developers. However, if left un-moderated, bad sportsmanship in the aggregate can ruin an online community. The system utilizes an alternate player pool for players found to be bad sports. Accordingly, these players are not prevented from continued play of the game, but they are forced to play in an environment with other bad sports. This alternative player pool will be segregated from the general pool and players in the alternative pool will not be able to play in the general pool for a predetermined amount of time, proportional to the severity of their conduct. Thus, the system allows players the freedom and flexibility to engage in a larger variety of conduct without adversely affecting other players. If players enjoy a more aggressive and hostile play environment, they may choose to play in the alternate player pool. However, if they wish to play in the general player pool, they must abide by the rules. In an alternative embodiment, players can choose to play in the alternate player pool and engage in conduct that would be considered bad sportsmanship without adversely affecting their classification. However, once a player is classified has a bad sport, they do not have the option to play in the general player pool. In some embodiments, there could be multiple alternate player pools commensurate with each type of bad act, for instance, players with bad sportsmanship will be forced to play in a bad sportsmanship pool, while players caught cheating must playing in a cheaters pool where their statistics are not recorded. In appropriate circumstances, players in these segregated player pools may be able to earn their way back into the general player pool for good behavior.

The system utilizes a point based sportsmanship system where each time a player is found to engage in bad sportsmanship, their bad sportsmanship value is incremented by an appropriate value. The value can be incremented for automatically detected activities such as exiting a game prematurely. Depending on the type of game or the application, automatic detection can be tailored to detect other undesirable conduct. The bad sportsmanship value can also be incremented though peer reports. The value incremented for a peer report depends on the severity of the act and whether the reporter is a frequent reporter. To prevent abuses, players who submit multiple reports within a short time will have the value of the "weight" of their reports drop. The negative points can also be offset by positive reports which are similarly weighted.

The first time that a player is classified as a bad sport, they are sent to the alternate player pool for a predetermined amount of time. Once the time is over, the player is returned to the general player pool with their bad sportsmanship value reset to zero, however their classification history is continually tracked. For players with repeated bad sportsmanship classifications, the system can automatically and incrementally increase the duration of the subsequent sentences. In an optional embodiment, the player could be permanently banned if their history of negative classification crosses some threshold. The alternate player pool is made up of players who have been classified as cheaters or bad sports and prevents their style of play or conduct from negatively affecting the general player pool.

Working in parallel with the bad sports automatic classification system is a cheater detection system which has a far wider range of checks both in-game and at the backend. Instead of automatically classifying players as cheaters for predetermined activity, the cheater detection system creates a list of potential cheaters for further review by the admin staff based on a predetermined set of checks. The cheater checks include but not limited to: modification of saved data, profile data, stat data, and game files. The failure of one of these checks causes an entry to be created in a "global violation table," which includes the following data: user ID, system, timestamp, and event data. In addition to compiling a list of potential cheaters, the system also compiles a report of all relevant player activities for the admin staff to conduct an investigation including bad sportsmanship history. The admin staff then reviews the report of the players on the potential cheaters list and makes a determination on whether the player is guilty of cheating. If the player is determined to be a cheater, then the admin staff can manually transfer the player to the alternate player pool for an appropriate sentence. If the player is found to be innocent, then the player is transferred back to the general player pool with all their cheater checks ignored by the system. Additionally, there can also be conduct that is so egregious that the only appropriate response is a permanent ban. In an alternative embodiment, an algorithm can be written to automatically punish and classify players based on any combination of threshold values of player activity without the need fro admin staff to review the potential cheaters list.

An embodiment that is provided for the present invention is implemented in a network gaming system having a first and second player pool and a plurality of players in each pool. The players all have player records including a player classification statistic. The system also has a monitoring component configured to detect at least one of a plurality of predetermined negative player actions and further configured to increment the player classification statistic of the player record corresponding to detection of a player performing one of the predetermined negative player actions. Additionally the monitoring component may detect a second set of predetermined negative player actions and place the player on a potential cheaters list upon detection of a player performing one of the second set of predetermined negative player actions. The system has a determining component configured to evaluate whether the player classification statistic of any of the player records has reached a threshold value and when the threshold value is reached, adding a negative classification to the corresponding player record. The system may have a second determining component for investigating the potential cheaters list based on information related to the players on the list such as their classification statistic, classification history, statistics, and connection speed. Based on certain thresholds and combinations of the player's information, the second determining component may automatically or manually classify the player as cheater. The system also has an enforcement component configured to place the players in a first or second player pool based on the player's classification. The player classification also expires over a predetermined amount of time. Alternatively, some player classifications must be manually altered and do not expire over time.

DETAILED DESCRIPTION

Figure 1:
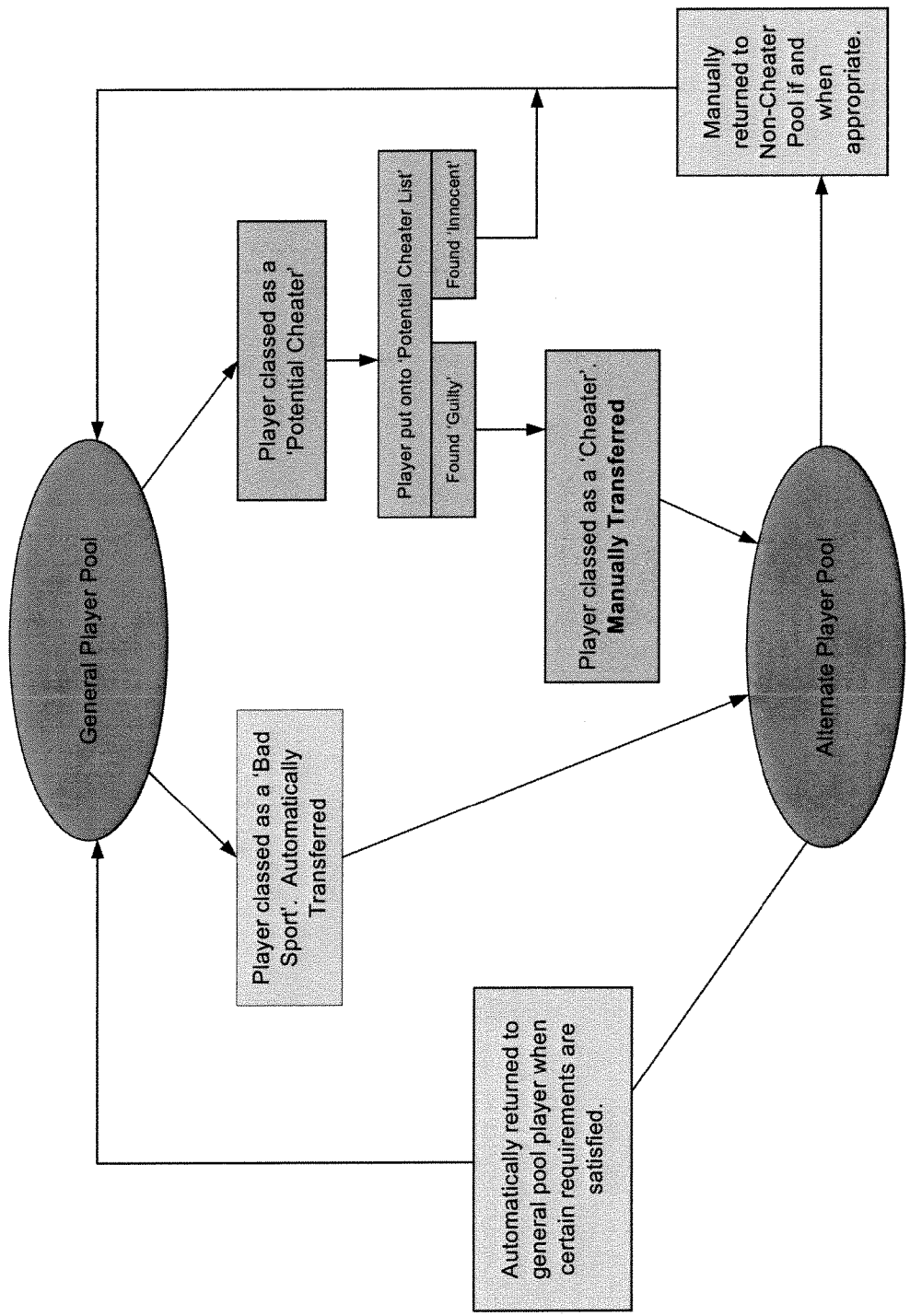
FIG. 1 is flow chart outlining the player classification system.

The present disclosure describes a number of methods and computerized systems for quick, efficient, fair, and flexible management of an online community. The present disclosure further describes an automated system capable of identifying predetermined conduct. Based on the conduct, the system could take automatic action or flag the players for further investigation by admin staff. As a result of the automatic detection or admin review, the players can be sent to an alternate pool of players for a predetermined amount of time. Alternatively, players may also be banned from playing the game depending on the severity of the conduct.

The system is implemented between a network cloud comprising a single server machine, multiple server machines, and/or a content delivery network communicating with a plurality of player consoles. A player console can be any system with a processor, memory, capability to connect to the network, and capability of executing gaining software in accordance with the disclosed invention. Some examples of a console include: Sony Playstation, Microsoft Xbox, Nintendo Wii, personal computers, and even smartphones. A hardware and network implementation suitable for the disclosed system is described in greater detail in co-pending commonly assigned application Ser. No. 13/894,099, entitled "System and Method for Network Gaming Architecture," incorporated herein by reference.

First, the system comprises two elements, an automated component and a manual component maintained and operated by admin staff. The automated component is used to detect predetermined activities that are deemed to be undesirable. Undesirable conduct includes: bad sportsmanship, bullying, offensive conduct, offensive content, poor network connection, manipulation of stats, bug exploitation, repeat offenders, hacking, piracy, or any conduct deemed by admin staff to be unwanted or harmful to the community. In essence, management of an online community is not unlike management of any society. To fairly and effectively address undesirable conduct, an online community management system must be able to appropriately address each type of infraction though identification, classification, and proportionate punishment. To properly identify and address each type of conduct, the system utilizes a classification system including five classifications: non-cheaters, bad sports, cheaters, repeated cheaters, and banned players. All players are initially classified as non-cheaters. In addition to the classification system, an appropriately scaled punitive system can be automatically implemented to issue appropriate punishment.

Undesirable conduct is segregated into two types of conduct: bad sportsmanship and cheating. Bad sportsmanship relates to conduct that, while not cheating creates a hostile and uncomfortable gaming experience for other players. The main types of bad sportsmanship or anti-social behavior are: offensive or inappropriate conduct over messaging or voice chat services, using offensive or in appropriate user generated content such as artwork or other customizable content, sabotaging team members, quitting during play of a game, or bullying. This type of conduct makes up a large majority of the negative reports from any online community.

To address bad sportsmanship, the system implements several features, a point based bad sportsmanship statistic is provided that is incremented by a negative peer report or certain pre-determined behaviors automatically tracked by the system.

Peer Report System

Due to the amorphous nature of bad sportsmanship, it is difficult for admin staff and game developers to program and create a system that automatically detects every possible instance of bad sportsmanship. Additionally, due to the large number of games being played it is also unfeasible for admin staff to police sportsmanship. Thus the system provides tools for players to police sportsmanship though a peer reporting system. The peer reporting system allows players in the same game to submit a negative peer report against a player for bad sportsmanship. The reporting system can be implemented for example as a dropdown menu accessible at any time during the game. The menu provides players with a list of other players currently in the game. The player first selects the offending player from the menu and then selects either a positive or negative report followed by the reason for the report. The reasons for the report can be as numerous as necessary to address the specific implementation of the system; however, in the present embodiment, players may choose: offensive conduct or "griefing." Other potential offenses can include: sabotage of game, killing allies (if possible), failure to cooperate with game, purposely dying to give opposing team points, or giving away ally position. A negative peer report from another player automatically increases the player's bad sportsmanship statistic; however, a positive report can decrease the player's statistic. To manage abuses, the system also decreases the influence of a peer report for players submitting numerous reports over a predetermined period of time. If a player reports an inordinate number of abuses, it could be that the reporter is overly sensitive and the impact of their reports should be reduced. This can be done by providing an appropriate and proportionate multiplier to a peer report. In the present embodiment, players submitting more than one report during a match may only increase the offending player's bad sportsmanship statistic by half of the normal value. Alternatively, other incentive based systems can be used in addition or alternative to the current "weighted" system to manage peer report abuse such as requiring players to use game credits or currency to submit peer reports.

Additionally, different types of abuses can be given varying values based on their severity as judged by the implementer of the system. For instance, offensive conduct over voice chat or messaging can be annoying and harmful, but it might be decided that this sort of behavior only contribute 1 point to a player's bad sportsmanship statistic because they can be optionally muted by the other players. On the other hand, conduct that adversely affects the play of the game such as "griefing" can be treated more seriously by increasing a player's bad sportsmanship statistic by 2. "Griefing" refers generally to conduct that negatively affects the play of the game such as: bullying, harassment of players, sabotage of team events, or giving away teammate position. In addition to peer reports, players may also vote to kick an abusive player from the game. Similar to the peer report option discussed above, players may also access a menu of current players and select a player they wish to kick from the game for any reason. If enough players from the game, for example 66%, vote to kick a certain player, then that player is automatically kicked from the game and their bad sportsmanship statistic can be incremented. In the present embodiment the sportsmanship statistic is incremented by 1 for a successful vote resulting in the player being kicked out of a game.

Bad Sportsmanship Automatic Detection

In addition to the peer reporting system described above, the present invention also provides an automatic detection component that can be programmed to identify certain pre-determined activities that are considered to be bad sportsmanship. The program can be executed at the player console or on the developer server. In some embodiments, the developer server is implemented as a telemetry server as part of a cloud network wherein the telemetry server uses other information related to game play to detect bad sportsmanship. In addition to sportsmanship, the developer server can detect cheating as will be discussed in greater detail below. The specifics of the telemetry server and cloud network is discussed in greater detail in co-pending commonly assigned application Ser. No. 13/894,099, entitled, "Method and System for Network Gaming Architecture."

In the present embodiment the automatic detection is done at the player console and transmitted to the developer server to minimize processing overhead to the developer. Many multiplayer games are often cooperative and require the formation and cooperation of large teams, thus it is important that all players in the team are present and cooperate to create an entertaining, balanced, and competitive experience. A common occurrence in many multiplayer games is "rage quitting." Rage quitting is where players exit a game prematurely after becoming frustrated with the current status of play. This puts their allies at a severe disadvantage and thus also ruins the experience for the remaining players. Even if the player is exiting the game for other more legitimate reasons, it still leaves the other players at a disadvantage and should be discouraged. Thus, the system automatically detects when a player exits a game prematurely and their bad sportsmanship statistic can be increased. There are two ways a player can exit the game: (1) by selecting the exit option from the menu or (2) disconnecting their connection either though turning off their console or internet connection. The latter is considered more detrimental because repeated occurrences could corrupt game files and additionally could be an indicator of rage quitting. Thus, players disconnecting that way may have their bad sportsmanship statistic increased by 2 as compared to players that exit normally who would have their statistic only increased by 1.

Another negative influence on the game, although not related to sportsmanship, is players with a weak or slow internet connection. The system treats these players in the same way as bad sports since these players also need to be segregated from the general player pool. When a player is disconnected due to a connection problem, their bad sportsmanship statistic can be incremented as discussed above. Additionally, the system also records the player's connection speed and also logs the number of times they disconnect. This information can, also be used to match players with similarly weak connections as to minimize disruption to the general player pool.

Bad Sportsmanship Statistic Limit

Each time a player's bad sportsmanship statistic reaches a certain value (such as, 10, 20, 30, or 40) the system issues the player a warning informing the player that they are in danger of being unable to continue participation in the general player pool and instead must play in an alternate player pool. The system allows for flexibility and for players to adjust their conduct by having their bad sportsmanship statistic decrease in one of two ways. For example, the bad sportsmanship statistic could decrease by 1 for every thirty minutes of unreported play. And, as discussed above, positive peer reports can decrease the statistic with the same "weight" attribute based on the frequency of the reporter's reports.

Once the bad sportsmanship statistic reaches a limit, in the current embodiment, of 50, the player is classified as a "bad sport" and automatically placed into the alternate player pool. The classification is done by storing classification information to their player account located in a User Name Space at the developer server which is described in greater detail in co-pending and commonly assigned application Ser. No. 13/894,099, entitled "System and Method for Network Gaming Architecture," incorporated herein by reference. In the present embodiment the classification causes a +1 to be added to the player's hash value which is described in greater detail in co-pending and commonly assigned application Ser. No. 13/894,109, entitled "System and Method for Multiplayer Network Gaming," incorporated herein by reference.

Upon initiation of the game, the player's console downloads any script files from the server and executes an algorithm that produces a unique hash value based on the player's script files. This hash value will be checked by the multiplayer system so that only players with the same hash value are allowed to play together. This prevents players with different script files from playing together and thus potentially causing the game to crash or have errors. The system also checks the player's account to see if there are any additional values to add and in the case of a player classified as a bad sport, a +1 is added to the hash value. Alternately, the number could be added to the data used to generate the hash. Where the system is designed to only allow players with matching hashes to play together, players classified as bad sports cannot play in the general pool since their hash value is now the general pool's hash value +1. However, the other players with the bad sports classification will share the +1 hash value and they can be automatically segregated to play in an alternate pool of players. For embodiments with multiple alternate player pools, different values can be added.

In addition to storing the classification in the player's account, the system also stores a timer that will expire upon the end of the sentence. For the first bad sport classification, the player account is tagged as a bad sport for two days. Thus the player must play in the alternate player pool for two days until the classification timer expires. The system can gradually increment the length of subsequent sentences, e.g., 4, 8, 16, etc. However, players who persist in bad sportsmanship may also be upgraded the "cheater" classification.

Additional punishments could be implemented to deter unsportsmanlike conduct such as the addition of an undesirable "dunce cap" shaped like a paper cone on the player's character's head. Other more severe punishments can include limiting a player's ability to transfer in game credits or the use of personalized content such as decals or emblems. Further still, more tailored punishments befitting of the infraction could be crafted such as automatically muting players who have a significant percentage of their peer reports relate to offensive conduct over voice chat.

The left side of FIG. 1 depicts the bad sportsmanship process flow. All players start in the general player pool and classified as non-cheaters. If they are classified as bad sports based on their conduct as discussed above, the player is automatically transferred to the alternate player pool until certain requirements are satisfied, e.g., their bad sport classification timer expires. Once their bad sport classification timer expires, the players are returned to the general player pool with their bad sportsmanship statistic reset to zero, however the system will retain a history of their classification so that future classifications can recognize the history and increase sentencing accordingly.

Turning now to the right side of FIG. 1, the cheater classification system will be described. The cheaters classification system utilizes an automated component to detect activities that can be indicators for cheating and compiling a "Potential Cheaters List" for further review by admin staff. Upon a determination by admin staff, the player is transferred to the appropriate pool, either back to the general pool for innocent players or the alternate player pool with a cheater classification for guilty players. The primary difference between the cheaters system and the bad sports system is that the cheaters system does not automatically classify players as "cheaters." In the present embodiment, cheater classification is preferably done by admin staff with the aid of an automated component. However, it should be understood that in other implementations of the system, certain activities can automatically lead to cheater classification. The automatic cheater classification system can utilize a plurality of threshold checks in conjunction with incremented automatic checks similar to the bad sportsmanship statistic being incremented and threshold values monitored as discussed above.

Potential Cheaters Detection

Behaviors classified as cheating require a wider range of checks that occur both in-game and at the backend. The automated component of the system will perform a plurality of checks in helping admin staff identify players that are potentially cheating. One type of check relates to exploitation of lag to gain an unfair advantage during the game. In the present multiplayer game embodiment, players may exploit delays in information being sent through the multiplayer game system by temporarily disconnecting from the network for short periods of time while they maneuver to an advantageous position to shoot other players. After several seconds of delay, their connection is reestablished, their actions are sent, and the game tries to catch up. This causes players to appear to jump or teleport potentially giving them an unfair advantage over other players. In essence this is the same to players with bad connections and they can be dealt with in the same manner by having their connection speed logged and the number of disconnects tracked. This information can similarly be used to match players with similar connection problems in order to minimize disruption to the general player pool. Additionally, they can be reported as a potential cheater for further investigation by admin staff if temporary disconnects become a recurring problem. This could be implemented using a counter with a minimum threshold before placing a player on the potential cheaters list. Generally players with poor connections do not perform well in the game, thus a secondary score check could be implemented to distinguish between players with poor connections and potential cheaters. Potential cheaters will have similar connectivity issues reported, but will also have an uncharacteristically high score.

Modification of any files such as saved games, profile data, or leader board scores can be automatically detected by the system. For instance, with respect to saved games data, redundancy checks through the use of specialized algorithms that generate unique hash values (CRC number) at the player console can be communicated to the server when the player saves a game, and the same number can be recalled from the server and checked again when the player loads a game to make sure the two CRC numbers match. If there is a discrepancy in the values, the system automatically adds the player to the potential cheaters list. Similarly, for leader board or profile data, the system can implement an automatic redundancy check or alternatively manual checks by admin staff can be employed. If there is any discrepancy, then players are also to be automatically added to the potential cheaters list.

Peer-to-Peer File Modification Detection

In an embodiment of the present invention, a multiplayer match is implemented over a peer-to-peer network which is discussed in greater detail in co-pending and commonly assigned application Ser. No. 13/894,099, entitled "System and Method for Multiplayer Network Gaming," incorporated herein by reference. Each peer performs automatic and autonomous checks against either all or random peers. These checks can take the form of CRC checks as discussed above, or in addition include checks for detecting obvious signs of cheating such as a player taking unreasonable amounts of damage before dying (invincibility hacks), firing large amounts of bullets without reloading (infinite ammo hacks), or moving impossibly fast (run speed hacks). Furthermore, the system can implement CRC checks of critical segments of the console/game memory which control core game logic from a randomly selected player. CRC checks could also be implemented for any game file such as metadata files that control weapon tuning, progression data, experience modifiers, etc. This minimizes the processing time and resources required to run a CRC check. If the CRC numbers do not match, the player is reported. If the player does not respond in a reasonable amount of time, they are also reported. Additionally, if a remote player does an excessive number of requests, their requests are ignored and they are also reported as this may be a sign of a flood attack to invalidate the system by delaying real requests from other consoles. The CRC checks are performed in a low-priority background thread in order to avoid negatively affecting game play or network performance by placing them in a hardware thread different than the main game, streaming, and network threads. All reports are sent to the developer server along with both player's unique ID, i.e., the requesting and responding player, the type of cheat detected, and the relevant CRC data reported. The CRC checks are implemented in the scripting language understood by the system such that any in-game situation could trigger a specific CRC check. For instance, being killed too many times by one player would trigger a CRC request against the weapon files for that player. Additionally the script and checks are implemented such that they do not contain any language or labels that would indicate they are for cheat detection such as, "remote cheat."

Potential Cheaters List

Figure 2:
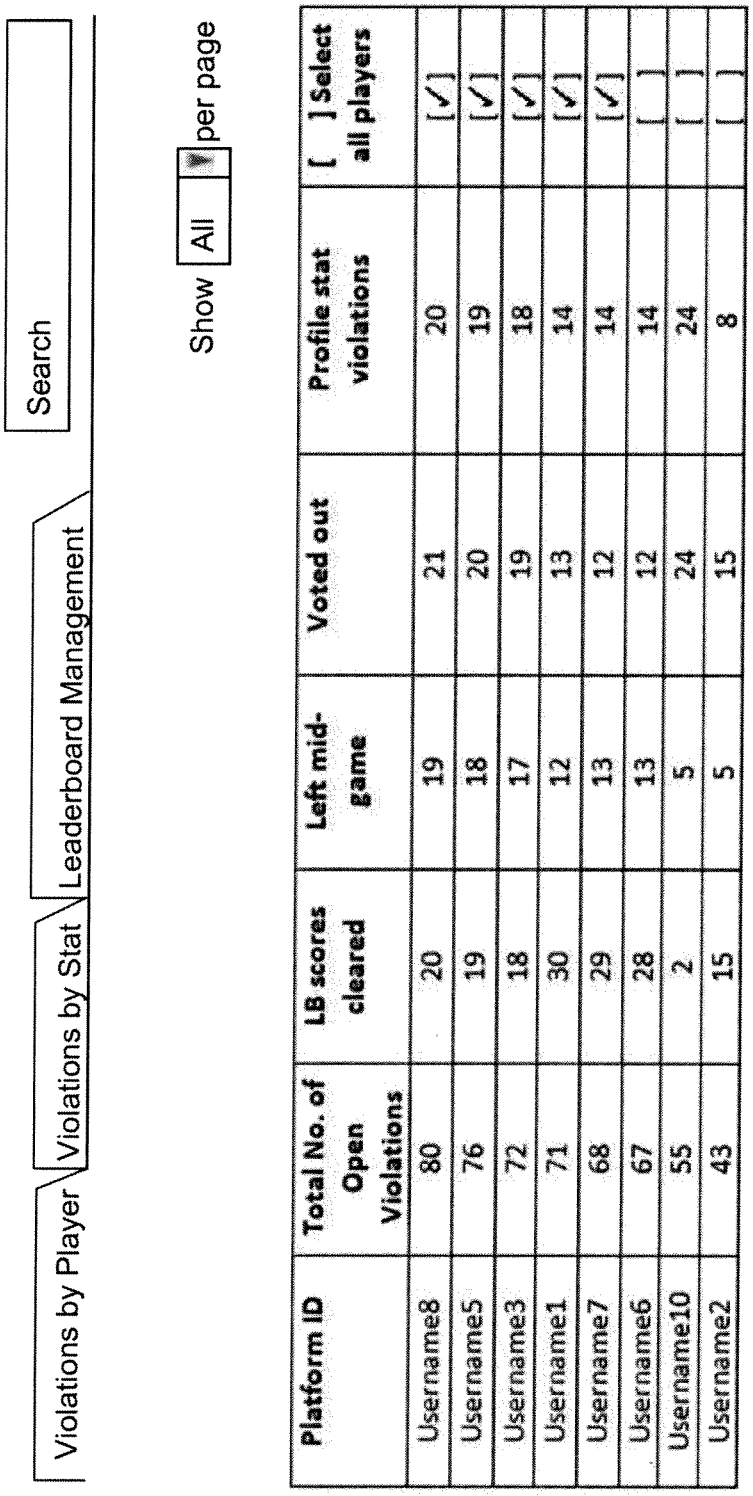
FIG. 2 is a potential cheater list report according to an embodiment of the present invention.

The automated component of the system compiles a list of players identified as potential cheaters and also compiles information related to the players' game activity including-player ID, total number of violations, leader board scores cleared as a result of scores being attributable to a cheating player, number of times player left mid-game, number of times player voted out of a session, and profile statistics violations. FIG. 2 depicts a potential cheaters list in accordance to an embodiment of the present invention.

The admin staff is then tasked with reviewing the player history to make a determination on whether the player was guilty or innocent. If the player is found to be guilty, they are classified as "cheaters" and the appropriate information is stored on their profile within the developer server. Players classified as cheaters do not have their classification automatically removed over time like the bad sports classification. Instead the sentencing and duration (if any) can be manually set by the admin staff. In alternative embodiments, the cheater determination and classification can be automatically done based on a predefined algorithm that takes into account all player activity. If the player is found to be innocent, they are removed from the potential cheaters list and all their current cheater checks are set to be ignored by the system so that they are not automatically placed back on the potential cheaters list.

Banned Player Cheats

Some conduct is so disruptive that the only appropriate remedy is banning the player. Modification of game or executable files and memory modification are extremely disruptive and can harm the entire system, thus upon detection an immediate ban is sometimes necessary. Fortunately, these checks are fairly easy to implement and can be done using the automated component of the system. Similar to the redundancy checks discussed above for saved game data, similar redundancy checks can be used to generate CRC numbers for ISO files or any other potentially modifiable data. Upon detection, the system could automatically ban players or place them into the potential cheaters list.

Gold/XP farming is another ban-able offense and is defined as selling in-game currency for real world currency. Players can also create game modes that give unfair amounts of experience. Any players caught in these acts are automatically placed on the potential cheaters list or banned. To help detect these activities, the system can implement delta checks. i.e., checks on differences between two values. For instance if a player's cash increases by an unrealistic amount over a short period of time, this could indicate they have recently purchased from other player in-game currency. Players who are caught engaging in this activity will be added to the potential cheaters list and have their currency stripped from them. An exception for currency purchased from the developer store can be added.

While banned, players are not allowed to use the online component of the game, however they may still play the offline single player version.

Repeat Offenders

Repeat offenders can have their classification upgraded to "repeated cheaters." Repeated cheaters are the same as "cheaters" except they will no longer be able to upload stats to the developer server.

Backend Considerations

For instances in which a player believes that their classification or increment of their bad sportsmanship statistic is in error, the player may contact admin staff to have the issue resolved and reviewed. If the player is found to be correct, then the admin may take any corrective measure they see fit.

Matchmaking

In addition to making sure a player's hash values match and that the player is playing in the appropriate pool, the system also allows for other preferences to be added to the matchmaking system. Player's friend list, ban list, bad sportsmanship statistic, age, skill level, and player type (i.e., difficulty level setting) can all be taken in to account such that players are similarly matched with other players of the same preferences. Further, with respect to the ban list, players will not be matched with players that are on their ban list.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. An interactive computer system for online community management system based on automated tiered player classification and weighted enforcement, comprising:
   an interactive computer program product;
   one or more local client computers generating network communication requests through said interactive computer program product;
   a server operatively coupled with the one or more local client computers through said interactive computer program product that is configured to detect at least one of a plurality of predetermined negative player actions and further configured to execute a hash function used to increment the player classification statistic of the player record by a weighted numerical value corresponding to detection of a player performing one of the predetermined negative player actions; and
   a hash table coupled with the server for maintaining a first player pool and a second player pool;
   wherein a plurality of players are associated with hash values that define player records comprising player classification statistics, and said server evaluates whether the player classification statistic of any of the player records has reached a threshold value and when the threshold value is reached, add a negative classification to the hash value defining the corresponding player record, the weighted numerical value being unique for a selected predetermined negative player action and a second predetermined negative player action; and places players in the first or second player pool based on the negative classification.

2. The system of claim 1 wherein players with the negative classification are not allowed to participate in the first player pool.

3. The system of claim 1 wherein the player classification statistic is reduced over time.

4. The system of claim 1 wherein the plurality of predetermined negative player actions include disconnecting and exiting a game before the game match ends.

5. The system of claim 1 wherein the player classification statistic is also incremented if the player receives a negative peer report from another player.

6. The system of claim 5 wherein the value that the player classification statistic is incremented is modified by a weight factor based on the frequency of the reporting player's peer reports.

7. The system of claim 1 wherein the negative classification expires after a predetermined amount of time.

8. The system of claim 7 wherein the server also records the number of times the player has reached the threshold value.

9. The system of claim 8 wherein the predetermined amount of time is determined based on the number of times the player's classification statistic has reached the threshold value.

10. The system of claim 1 wherein the server uses the player's classification statistic hash value to match players in a game.

11. The system of claim 10 wherein admin staff reviews the potential cheaters list and make determinations on whether to classify the player as a negative classification.

12. A computer program product comprising a processor-readable medium having a sequence of instructions stored thereon, which, when executed by a processor, causes the processor to execute a process for managing an online community for automated tiered player classification and weighted enforcement via the computer program and comprises:
identifying a plurality of players with-hash values defining player records comprising player classification statistics, each player classification statistic representing a numerical value;
allowing players to initially play in a first player pool;
detecting a first plurality of player activities;
upon detection of at least one of the first plurality of player activity, executing a hash function for incrementing the player's classification statistic by a weighted numerical value being unique for a selected predetermined negative player action and a second predetermined negative player action;
detecting a second plurality of player activities;
upon detection of at least one of the second plurality of player activities adding the player's hash value to a potential cheaters list;
detecting whether the classification statistic for one or more players has reached a threshold;
upon detection of the classification statistic reaching the threshold, classifying the hash value of the player as a first classification for a predetermined amount of time; and
forcing classified players to play in a second player pool separate from the first player pool.

13. The method of claim 12 further comprising matching players in a game using the player's hash value.

14. The method of claim 12 wherein the first plurality of player activities includes at least one of offensive conduct over voice chat services, using offensive user generated content, sabotaging team members, quitting during play of a game, bullying, sabotage of the game, killing allies, failure to cooperate with the game, purposely dying to give opposing team points, hacking the game, modifying the game, and giving away ally position.

15. The method of claim 12 wherein the potential cheaters list further comprising information related to the first and second plurality of player activities detected.

16. The method of claim 12 further comprising:
reviewing the potential cheaters list and making a determination based on the information on whether to classify the players on the potential cheaters list as a second classification.

17. The method of claim 16 wherein the predetermined amount of time is determined based on the number of times the player had been classified as a first classification.

18. The method of claim 12 further comprises decreasing the player's classification statistic over a period of time or with the detection of a positive peer report.

19. The method of claim 12 further comprising:
resetting the player classification statistic after the predetermined amount of time has expired.

20. A non-transitory computer readable medium having instructions for causing a computer to execute a method comprising
identifying a plurality of players with hash values defining player records comprising player classification statistics, each player classification statistic representing a numerical value;
allowing players to initially play in a first player pool;
detecting a first plurality of player activities;
upon detection of at least one of the first plurality of player activity, executing a hash function for incrementing the player's classification statistic by a weighted numerical value being unique for a selected predetermined negative player action and a second predetermined negative player action;
detecting a second plurality of player activities;
upon detection of at least one of the second plurality of player activities adding the player's hash value to a potential cheaters list;
detecting whether the classification statistic for one or more players has reached a threshold;
upon detection of the classification statistic reaching the threshold, classifying the hash value of the player as a first classification for a predetermined amount of time; and forcing classified players to play in a second player pool seperate from the first player pool.

* * * * *